United States Patent Office 3,452,265
Patented June 24, 1969

3,452,265
**ELECTRIC PULSE MULTIPLYING
AND STEERING CIRCUIT**
Robert P. De Puy, Cherry Hill, N.J., assignor to General
Electric Company, a corporation of New York
Filed Dec. 18, 1967, Ser. No. 691,343
Int. Cl. H02m 7/22
U.S. Cl. 321—5                                  12 Claims

ABSTRACT OF THE DISCLOSURE

The input windings of three or more transformers are serially interconnected to form a ring circuit to which a train of at least three discrete input signals is supplied, and a plurality of unidirectionally current conducting means are disposed in series with the windings, respectively. The input signals are applied in sequence to at least three different interlinked sets of the input windings, and each is so poled, relative to the unidirectionally conducting means, that it simultaneously energizes all input windings belonging to the corresponding set. Each transformer in the ring circuit consequently produces output pulses in response to consecutive input signals being applied to the particular sets to which its input winding belongs. In order to reset the transformer cores following each output pulse, all input windings are connected in parallel, via a plurality of isolating diodes that are individually associated therewith, to a common source of unipolarity voltage.

---

In the electric power conversion art, it is common practice to govern the flow of electricity between a given source and a connected load by means of a converter comprising a power transformer in combination with a plurality of pairs of alternately triggered load-current conducting controlled rectifiers. For purposes of control, the converter is also provided with means for generating a train of discrete gate pulses which effect periodic triggering of the controlled rectifiers in a predetermined sequence. In certain circumstances it is sometimes necessary, as each rectifier in turn is triggered during each operating cycle of the converter, to reiterate the gate pulse for at least one of the preceding rectifiers in the sequence, whereby two or more different rectifiers are simultaneously triggered in response to each of the consecutive gate pulses in the train. One example of the need is explained in a 1941 reissued patent Re. 21,697—Lord which discloses double pulsing for a 3-phase doubleway A-C to D-C converter. As another example, triple pulsing is required to ensure proper starting and operation of a triple-diametric phase-controlled A-C to D-C converter of the kind described in a 1956 paper entitled "Test and Operating Experience With the Triple-Diametric Rectifier" by Wachter, Hague, and Marcum, 75 AIEE Trans., Part II, Applications and Industry, pages 100–06.

Accordingly, a general objective of my invention is to provide improved means for multiplying and for steering a given train of discrete electric pulses so as to produce a cyclic progression of multi-pulse groups, each group comprising two or more output pulses which are suitable for simultaneously triggering separate controlled rectifiers in either of the referenced settings.

Another objective is the provision of a novel pulse mixer that is relatively inexpensive to make, small in size, and reliable in operation.

My invention has been briefly summarized in the introductory abstract. It will be better understood and its various objects and advantages will be more fully appreciated from the following description taken in conjunction with the accompanying drawings in which.

Figure 1:
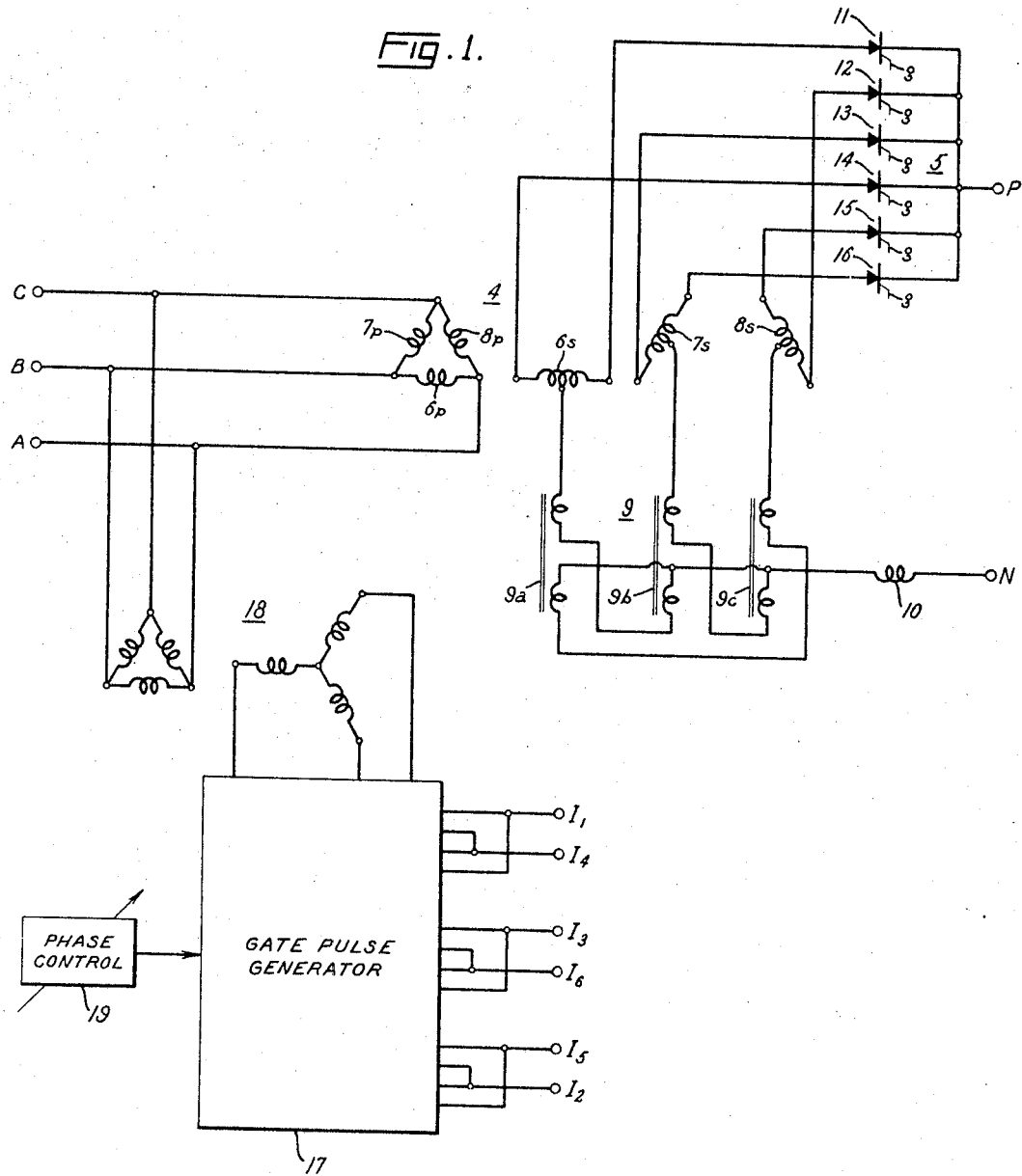
FIG. 1 is a schematic circuit diagram of a 3-phase, full-wave, single-way rectifier utilizing three pairs of alternately triggered controlled rectifiers in combination with a triple-diametric power transformer and a 3-phase interphase transformer.

Referring now to FIG. 1, a set of 3-phase A-C electric power supply terminals A, B, and C is shown connected to a pair of relatively positive and negative D-C load terminals P and N by way of a static power converter plant comprising a power transformer 4 and a rectifier section 5. The power transformer 4 has three delta-connected primary windings $6p$, $7p$, and $8p$ spanning the supply terminals A, B, and C, and these windings are inductively coupled to three secondary windings $6s$, $7s$, and $8s$, respectively. An A–B–C phase rotation is assumed.

The respective mid-points of the secondary windings of the power transformer 4 are connected to the load terminal N by means of a 3-phase interphase transformer 9 in series with a smoothing choke or reactor 10. The interphase transformer 9 has two separate windings on each of three legs $9a$, $9b$, and $9c$ of its core, and these windings are interconnected as shown in FIG. 1.

The rectifier section 5 of the illustrated converter is disposed between the load terminal P and the transformer secondaries $6s$, $7s$, and $8s$. A first pair of alternately triggered controlled rectifiers 11 and 14 of the section 5 connect opposite ends of the secondary winding $6s$ to the terminal P; a second pair of alternately triggered controlled rectifiers 13 and 16 connect opposite ends of secondary windings $7s$ to the same terminal; a third pair of alternately triggered controlled rectifiers 15 and 12 connect opposite ends of secondary winding $8s$ to the same terminal. (Often each of the controlled rectifiers shown symbolically in FIG. 1 and referred to herein in the singular will actually comprise an array of many duplicate semiconductor controlled rectifiers or thyristors suitably arranged for switching and conducting effectively in unison.) If the controlled rectifiers 11, 12, 13, 14, 15, and 16 are respectively triggered in their numbered order and in synchronism with the A-C voltages on the 3-phase supply terminals A, B, and C, direct current will be delivered to a load circuit connected between the terminals P and N. Normally each of the controlled rectifiers conducts load current for an interval of approximately 180 degrees each cycle of the supply voltage, and the converter acts like three single-phase diametric circuits in parallel.

To effect triggering of the controlled rectifiers 11–16, each of these elements is provided with a control electrode or gate g, and between cathode and gate a control signal or pulse of appropriate polarity, magnitude, and duration is applied. The control signals for the respective rectifiers 11–16 are taken from a pulse mixer (FIG. 2) which in turn is energized by a train of discrete current pulses $I_1$, $I_2$, $I_3$, $I_4$, $I_5$, and $I_6$ derived from a gate pulse generator 17 shown in FIG. 1. Since gate pulse generators are well known in the art, the details of 17 are not disclosed herein. One popular circuit that can well serve the purpose is shown in U.S. Patent 3,095,513—Lezan, granted June 25, 1963, and assigned to the General Electric Company.

As can be seen in FIG. 1, a delta-wye control power transformer 18 couples the gate pulse generator 17 to the 3-phase A-C supply terminals A, B, and C. The gate pulse generator includes six separate pairs of output terminals, and these pairs provide, in sequence, six gate pulses at intervals of 60 electrical degrees during each successive cycle of the supply voltage. The precise timing of the gate pulses relative to the supply voltage wave can be varied as desired by suitable phase control means 19 which determines the delay angle at which each rectifier is triggered or fired. As the delay angle is increased (retarded) from zero, the average magnitude of the rectified voltage between the load terminals P and N decreases from its maximum positive level. By known regulating means not shown in the drawings, the delay angle can be automatically adjusted to maintain the converter output substantially constant in spite of variations in source voltage or load impedance.

Figure 2:
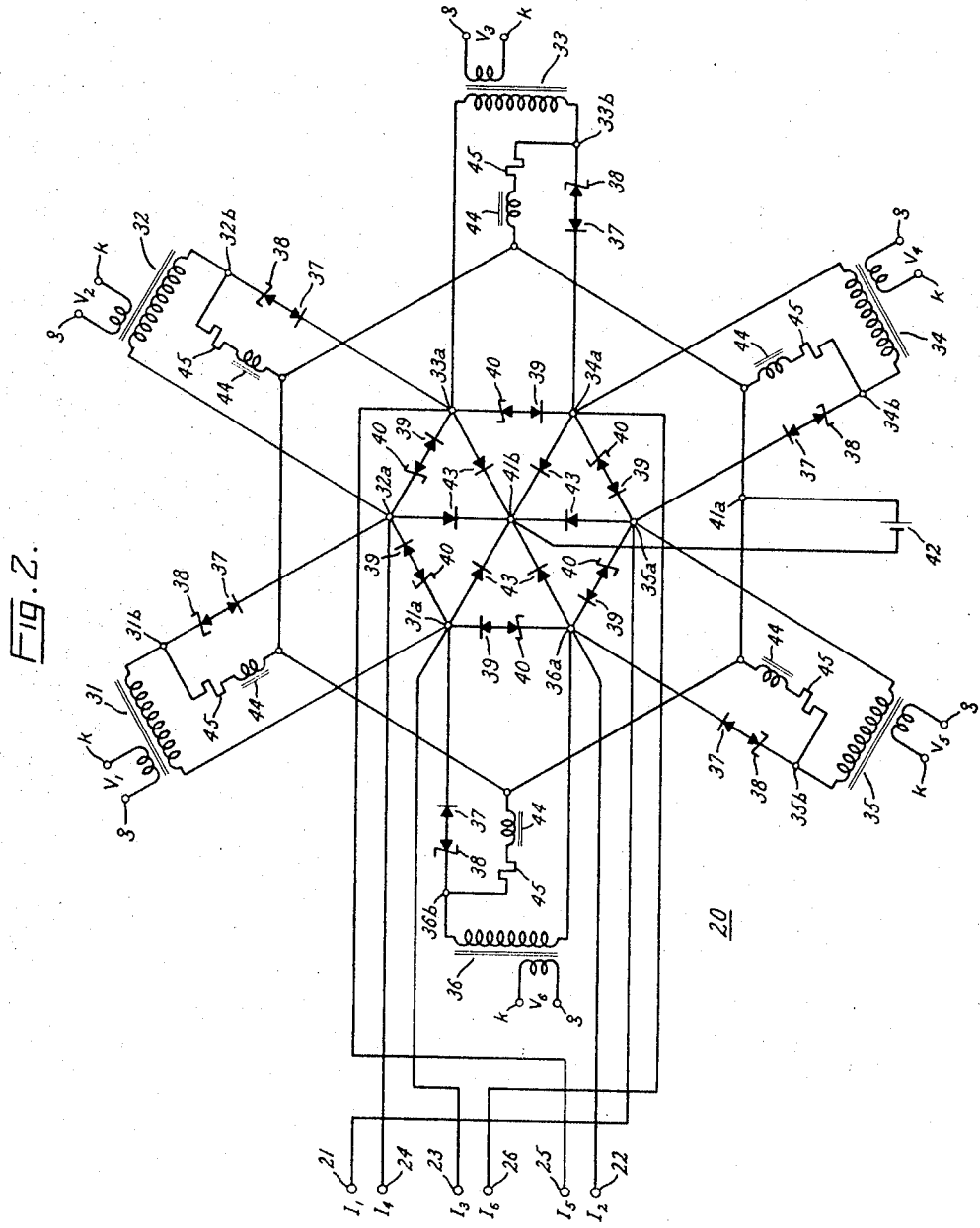
FIG. 2 is a circuit diagram of a pulse mixer embodying my invention and useful for controlling the controlled rectifiers shown in FIG. 1.

In the illustrated embodiment of my invention, alternately active pairs of the output terminals of the gate pulse generator 17 are interconnected as shown in FIG. 1, and one terminal of each pair is connected to a corresponding one of three pairs of input terminals of the pulse mixer 20 shown in FIG. 2. In this manner the respective input terminals 21, 22, 23, 24, 25, and 26 of the pulse mixer 20 are repetitively energized in sequence by the periodic signals $I_1$, $I_2$, $I_3$, $I_4$, $I_5$, and $I_6$. If desired, additional means (not shown) can be provided between the gate pulse generator and the pulse mixer for amplifying these signals before applying them to the terminals 21–26. Each signal preferably has a width of approximately 200 microseconds and has sufficient magnitude to effect triggering of a predetermined number of thyristors. The voltage magnitude of the signal source is relatively high, that is, several times the maximum voltage drop across the input terminals to which the signal is applied.

Figure 3:
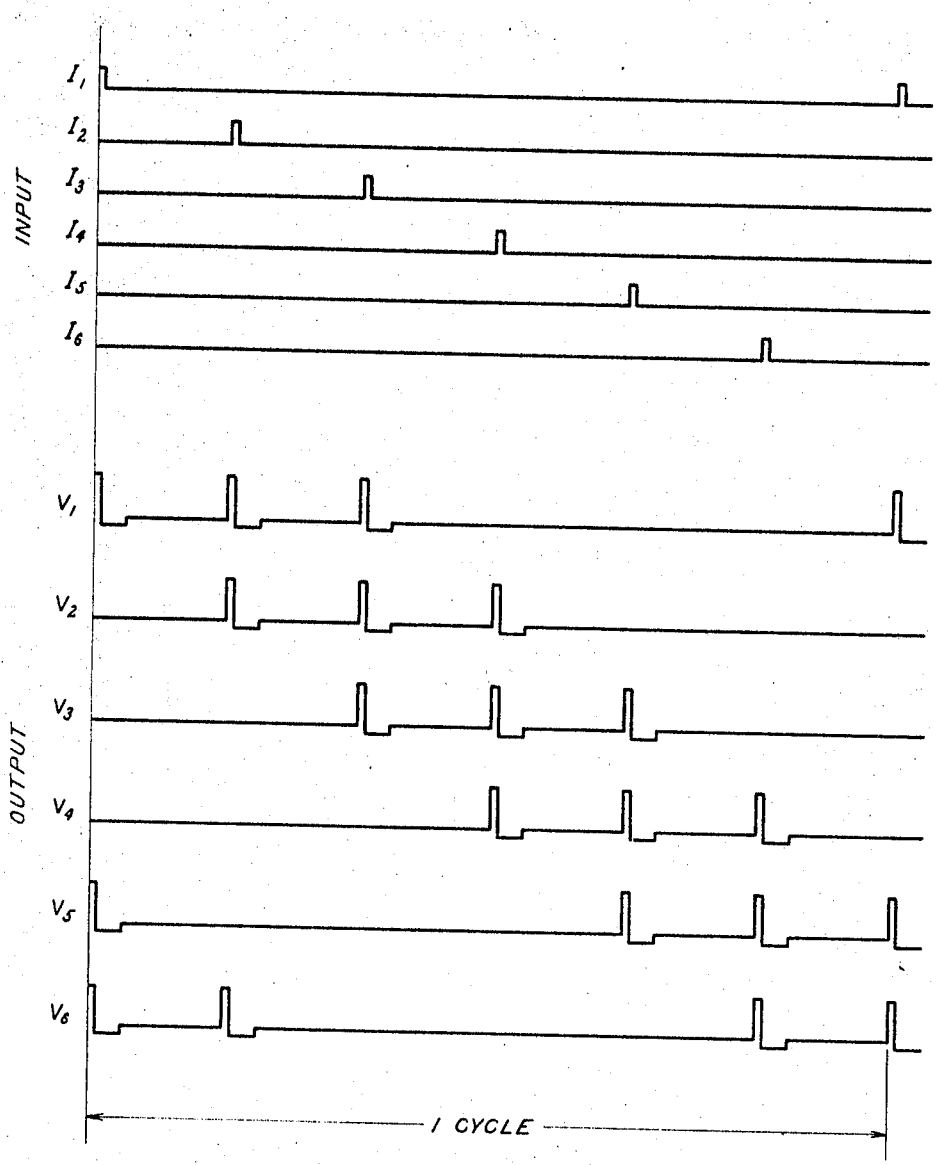
FIG. 3 is a time chart of the input pulses for the pulse mixer and of the output pulses derived therefrom.

The input signals delivered to the pulse mixer 20 during one steady-state operating cycle of the converter are indicated at $I_1$, $I_2$, $I_3$, $I_4$, $I_5$, and $I_6$ in FIG. 3. The first signal $I_1$ causes terminal 21 of the mixer 20 to be positive with respect to the companion terminal 24, while the fourth signal $I_4$ causes terminal 24 to be positive with respect to 21. Similarly, the third signal $I_3$ causes terminal 23 to be positive with respect to its companion terminal 26, while the sixth signal $I_6$ causes 26 to be positive with respect to 23. The fifth signal $I_5$ causes terminal 25 to be positive with respect to 22, and the second signal $I_2$ causes terminal 22 to be positive with respect to 25.

In accordance with my invention, the pulse mixer 20 comprises a ring circuit that is formed by serially interconnecting the respective input windings of a plurality of separate pulse transformers. Since the mixer illustrated in FIG. 2 is being used in conjunction with the sequential control of six rectifiers 11–16, six pulse transformers 31, 32, 33, 34, 35, and 36 have been shown. Each of these transformers has one input winding, a single core, and an output winding for each thyristor of the array that is repersented by a unitary controlled rectifier symbol in FIG. 1. If, for example, there are twelve thyristors per array, each pulse transformer will be equipped with twelve output windings.

The output winding of transformer 31 has its end terminals $g$ and $k$ connected to the gate and to the cathode, respectively, of the controlled rectifier 11 which is consequently triggered each time this winding has induced therein an output voltage $V_1$ so poled that $g$ is relatively positive. The output winding of the second transformer 32 has its end terminals $g$ and $k$ connected to the gate and to the cathode, respectively, of the controlled rectifier 12 which is consequently triggered each time this winding has induced therein an output voltage $V_2$ so poled that $g$ is positive with respect to $k$. The output windings of the four remaining transformers 33–36 are similarly connected to the controlled rectifiers 13–16, respectively, and these rectifiers are consequently triggered in turn in response to properly poled output voltages $V_3$, $V_4$, $V_5$, and $V_6$ that are respectively developed across the latter windings.

Each input winding of the various pulse transformers 31–36 in the pulse mixer 20 has first and second terminals at the opposite ends thereof. As can be seen in FIG. 2, input terminal 22 of the pulse mixer has been connected directly to the first terminal 36a of the input winding of transformer 36, and the companion input terminal 25 has been connected directly to the first terminal 33a of the input winding associated with the diametrically opposite transformer 33. Similarly, terminal 23 of the second input terminal pair has been connected directly to the first terminal 31a of the input winding belonging to transformer 31, and the companion terminal 26 has been connected directly to the first terminal 34a of the input winding of the transformer diametrically opposite thereto. Terminal 24 of the other pair of input terminals has been connected directly to the first terminal 32a of the input winding of transformer 32, and input terminal 21 has been connected directly to the first terminal 35a of the input winding of transformer 35.

The second terminals 31b, 32b, 33b, 34b, 35b, and 36b of the six input windings comprising the ring circuit are connected by way of six duplicate unidirectionally conducting means to the first terminals 32a, 33a, 34a, 35a, 36a and 31a of the input windings that are respectively adjacent thereto. Each of these unidirectionally conducting means is illustrated as a conventional diode 37 in series with a Zener diode 38. The respective diodes 37 permit current to flow through the input windings of the pulse transformers in a predetermined "forward" direction, and so long as the transformer core is unsaturated, increasing forward current in an input winding induces an output voltage that is relatively positive at terminal $g$. Because of the Zener diodes 38 a substantially constant voltage drop of predetermined magnitude (for example, three volts) is developed across each unidirectionally conducting means whenever any appreciable forward current is flowing therein. The same result can alternatively be obtained by using an appropriate plurality of silicon diodes in series with each diode 37 shown in FIG. 2. Its purpose is explained hereinafter.

My pulse mixer 29 preferably includes six more unidirectionally conducting means shunting the respective input terminals 21–26. Each of these means is illustrated as a conventional diode 39 in series with a Zener diode 40. The diodes 39 are poled in agreement with the diodes 37 in the ring circuit. That is, each diode 39 is able to conduct current when forward current is flowing in the corresponding diode 37. However, due to the companion Zener diode 40 whose breakdown voltage is relatively high (for example, 15 volts), the flow of any appreciable current in a diode 39 will be accompanied by a substantially constant voltage drop that is more than twice that of the Zener diode 38. The Zener diodes 40 determine the maximum magnitude of voltage applied across each of the transformer input windings, whereby each output pulse will persist for a prescribed length of time and will not terminate too soon due to premature forward saturation of the transformer core. As before, this function can alternatively be accomplished by using an appropriate plurality of silicon diodes in series with each diode 39 shown in FIG. 2.

To complete the pulse mixer 20, I have provided means for premagnetizing the cores of all six pulse transformers 31–36. Preferably the premagnetizing means comprises a pair of unipolarity voltage supply terminals 41a and 41b which are continuously energized by a suitable source of D.-C. voltage, such as the illustrated battery 42, and across which all of the input windings in the ring circuit are connected in parallel with each other. Preferably the battery voltage is 20 volts. For proper isolation, six unidirectionally conducting elements 43 (shown as simple diodes) are included in the connections from the relatively negative terminal 41b to the first terminals of the respective input windings, and six inductors 44, in series with current limiting resistors 45, respectively, are included in the connections from the positive terminal 41a to the second terminals of the same windings. The diodes 43 are poled to pass direct current from the battery 42 through each input winding in a "reverse" direction, that is, in a direction opposite to that permitted by the associated diode 37. Consequently the battery 42 is effective to reset the cores of the respective pulse transformers 31–36 immediately after each output voltage signal.

The inductors 44 ensure an effectively constant current source for resetting each of the transformer cores. Any reverse current in excess of the excitation current in each input winding is bypassed through the associated diode 37 and a diode 43. Due to the associated Zener diode 38, there is still sufficient voltage (3 volts) to drive the transformer core through a full flux excursion to a reverse saturation state within a small fraction (e.g., about $\frac{1}{24}$) of a cycle. Thereafter the transformer voltage collapses and the input winding freely conducts reverse current until subsequently subjected to the next overriding forward input signal.

Two of the meritorious features of my invention can now be appreciated. By fully resetting the core of each of the pulse transformers 31–36 following every output pulse, I have minimized the size and expense of this component without sacrificing the requisite magnitude and duration of the output pulses that can be successively obtained therefrom. And this result is accomplished with such dispatch that reliability is preserved during transient conditions when consecutive pulses might recur at intervals appreciably shorter than 60 degrees.

The multiple output signals provided by my pulse mixer 20 for triggering the controlled rectifiers 11–16 during one steady-state operating cycle of the FIG. 1 converter are indicated at $V_1$, $V_2$, $V_3$, $V_4$, $V_5$, and $V_6$ in FIG. 3. Output signals $V_2$, $V_1$, and $V_6$ will be simultaneously produced by the set of three transformers 32, 31, and 36 whose input windings are jointly connected between the two input terminals 22 and 25 in response to these terminals being energized by the input signal $I_2$; the next group of simultaneous output signals $V_3$, $V_2$, and $V_1$ is produced by the set of three transformers 33, 32, and 31 whose input windings are jointly connected between the two input terminals 23 and 26 in response to these termials being energized by the input signal $I_3$; and so forth around the ring circuit. The resulting progression of 3-pulse groups of output signals enables three separate controlled rectifiers to be simultaneously triggered by each input pulse and ensures that each rectifier, in its turn, will be triggered three times in succession at 60-degree intervals. This ensures proper starting of the triple diametric converter and ensures proper performance thereof when operating in a discontinuous load current mode.

My pulse mixer can also be utilized to obtain double pulsing if desired. One way to do this is to employ the FIG. 2 arrangement without change and simply to ignore the second reiteration of each output signal as being superfluous and harmless. Another way is to change the connections between the gate pulse generator 17 and the pulse mixer 20 as follows: the first pair of output terminals of 17 is connected to input terminals 22 and 24 of the pulse mixer 20 so that input signal $I_1$ causes terminal 22 to be positive with respect to 24; the companion pair of output terminals of 17 is connected to input terminals 25 and 21 of the mixer so that input signal $I_4$ causes 25 to be positive with respect to 21; the third pair of output terminals of 17 is connected to input terminals 24 and 26 of the mixer so that input signal $I_3$ causes 24 to be positive with respect to 26; the companion pair of output terminals of 17 is connected to input terminals 21 and 23 of the mixer so that input signal $I_6$ causes 21 to be positive with respect to 23; the fifth pair of output terminals of 17 is connected to input terminals 26 and 22 of the mixer so that input signal $I_5$ causes 26 to be positive with respect to 22; and the companion pair of output terminals of 17 is connected to the input terminals 23 and 25 of the mixer 20 so that input signal $I_2$ causes 23 to be positive with respect to 25.

While I have shown and described a preferred embodiment of my invention by way of illustration, many modifications will no doubt be obvious to those skilled in the art. In view of the possibility that the form in which the invention is practiced can vary from the form which has been specifically disclosed herein, it should be understood that I do not wish to be limited to the exact details of construction of the illustrated embodiment.

What I claim as new and desire to secure by Letters Patent of the United States is:

1. In combination:
   (a) a plurality of pulse transformers each having an input winding, a core, and at least one output winding, each input winding having first and second terminals;
   (b) a plurality of input terminals connected directly and individually to the first terminals of the respective input windings of said pulse transformers;
   (c) means for connecting all of said input windings in series with one another to form a ring circuit, said means including a plurality of unidirectionally conducting means respectively disposed between the second terminal of each input winding and the first terminal of an input winding adjacent thereto; and
   (d) means for premagnetizing the cores of all of said pulse transformers in a sense opposing the magnetization resulting from current traversing said input windings in the direction permitted by said unidirectionally conducting means.

2. The combination of claim 1 in which there are six pulse transformers, six input terminals, and six unidirectionally conducting means.

3. The combination of claim 1 in which said premagnetizing means comprises:
   (i) a pair of unipolarity voltage supply terminals and
   (ii) means for connecting all of said input windings in parallel across said voltage supply terminals, said last-mentioned means including a plurality of diode respectively associated with said input windings and poled to pass current through each input winding in a direction opposite to that permitted by said unidirectionally conducting means.

4. The combination of claim 1 in which the last-mentioned means includes a plurality of indicators respectively associated with said input windings, said diodes being connected from one of said voltage supply terminals to said first terminals and said inductors being connected from the other voltage supply terminals to the second terminals of the respective input windings of said pulse transformers.

5. The combination set forth in claim 1 in which each of said unidirectionally conducting means is so constructed and arranged that the flow therein of any appreciable current is accompanied by a substantially constant voltage drop of predetermined magnitude.

6. The combination set forth in claim 5 in which said input terminals are shunted by another plurality of unidirectionally conducting means each of which is so constructed and arranged that the flow therein of any appreciable current is accompanied by a substantially constant voltage drop that is more than twice said predetermined magnitude, said other plurality of unidirectionally conducting means being poled in agreement with the unidirectionally conducting means in said ring circuit.

7. The combination set forth in claim 5 in which said premagnetizing means comprises an individual, substantially constant current source connected to each of said input windings for supplying direct current thereto in a direction opposite to that permitted by said unidirectionally conducting means.

8. The combination of claim 7 in which said input terminals are shunted by another plurality of unidirectionally conducting means each of which is so constructed and arranged that the flow therein of any appreciable current is accompanied by a substantially constant voltage drop that is more than twice said predetermined magnitude, said other plurality of unidirectionally conducting means being poled in agreement with unidirectionally conducting means in said ring circuit.

9. The combination of claim 1 in which said input terminals are shunted by another plurality of unidirectionally conducting means each of which is so constructed and arranged that the flow therein of any appreciable current is accompanied by a substantially constant voltage drop of predetermined magnitude, said other plurality of unidirectionally conducting means being poled in agreement with the unidirectionally conducting means in said ring circuit.

10. An electric pulse multiplier comprising:
 (a) a plurality of transformers each having an input winding, a core, and at least one output winding from which output pulses are desired;
 (b) means for connecting the input windings of all of said transformers in series with one another to form a ring circuit, said means including a plurality of unidirectionally conducting means in series with said input windings, respectively;
 (c) a plurality of input terminals arranged in at least first and second different pairs, said terminal pairs being adapted to be sequentially energized by periodic input pulses;
 (d) means for connecting the input winding of a first one of said transformers and the input winding of a second one of said transformers between the input terminals of said first pair so that output signals are developed in the output windings of both of said first and second transformers in response to said first terminal pair being energized by an input pulse of predetermined relative polarity;
 (e) means for connecting the input winding of said second transformer and the input winding of a third one of said transformers between the input terminals of said second pair so that output signals are developed in the output windings of both of said second and third transformers in response to said second terminal pair being energized by an input pulse of said predetermined relative polarity;
 (f) a pair of unipolarity voltage supply terminals; and
 (g) means for connecting the input winding of each transformer across said voltage supply terminals, the last-mentioned means including a plurality of unidirectionally conducting elements respectively associated with said transformer input windings and being so poled that said unipolarity voltage is effective to reset the transformer cores after each output signal.

11. The pulse multiplier of cliam 10 in which there is a third pair of input terminals and means for connecting the input winding of said third transformer and the input winding of a fourth one of said transformers between the input terminals of said third pair so that output signals are developed in the output windings of both of said third and fourth transformers in response to said third terminal pair being energized by an input pulse of said predetermined relative polarity.

12. An improved electric power converter comprising the combination of a 3-phase power transformer having three separate secondary windings, a 3-phase interphase transformer, and six controlled rectifiers, said combination being arranged in a triple-diametric configuration, wherein the improvement comprises a control circuit for triple-pulsing said controlled rectifiers, said control circuit comprising:
 (a) six pulse transformers each having an input winding, a single core, and an output winding, the output windings of the six pulse transformers being respectively connected to the controlled rectifiers of said converter;
 (b) means for connecting the input windings of all of said pulse transformers in series with one another to form a ring circuit, said means including six unidirectional conducting means in series with said input windings, respectively;
 (c) means for repetitively supplying a train of six discrete input signals to said ring circuit so as to energize in sequence six different interlinked sets of three input windings each; and
 (d) means for resetting the cores of said pulse transformers immediately following each of said input signals.

References Cited

UNITED STATES PATENTS

| | | | |
|---|---|---|---|
| 1,929,723 | 10/1933 | Willis | 321—36 |
| 2,825,022 | 2/1958 | Boyer et al. | 321—36 |
| 3,134,068 | 5/1964 | Feltman | 321—5 XR |
| 3,151,286 | 9/1964 | Berman et al. | 321—47 XR |
| 3,257,569 | 6/1966 | Abramson et al. | 321 — 5 XR |
| 3,354,376 | 11/1967 | Corey et al. | 321—5 |
| 3,398,348 | 8/1968 | Kilgore et al. | 321—5 |

FOREIGN PATENTS 906,876  9/1962  Great Britain.

JOHN F. COUCH, *Primary Examiner.*

W. M. SHOOP, Jr., *Assistant Examiner.*

U.S. Cl. X.R.

307—239, 252; 323—48